United States Patent [19]

Harrar et al.

[11] 4,328,106

[45] May 4, 1982

[54] METHOD FOR INHIBITING SILICA PRECIPITATION AND SCALING IN GEOTHERMAL FLOW SYSTEMS

[75] Inventors: Jackson E. Harrar, Castro Valley; Lyman E. Lorensen, Orinda; Frank E. Locke, Lafayette, all of Calif.

[73] Assignee: The United States of America as represented by the United States Department of Energy, Washington, D.C.

[21] Appl. No.: 159,313

[22] Filed: Jun. 13, 1980

[51] Int. Cl.³ .................................................. C02F 5/14
[52] U.S. Cl. ..................................... 210/700; 252/81; 252/181
[58] Field of Search .................. 210/698, 699, 700; 252/180, 181, 81, 82, 86, 87

[56] References Cited

U.S. PATENT DOCUMENTS

| 3,106,525 | 10/1963 | Schmid | 210/698 |
|---|---|---|---|
| 3,251,778 | 5/1966 | Dickson | 252/180 |
| 3,258,428 | 6/1966 | Dickson | 252/180 |
| 3,434,969 | 3/1969 | Ralston | 252/180 |
| 3,958,635 | 5/1976 | Zilch | 252/180 |
| 3,985,671 | 10/1976 | Clark | 252/180 |
| 4,008,165 | 2/1977 | Maddox | 252/180 |
| 4,032,460 | 6/1977 | Zilch | 252/180 |
| 4,039,459 | 8/1977 | Fischer | 210/700 |
| 4,085,060 | 4/1978 | Vassileff | 252/180 |
| 4,201,688 | 5/1980 | May | 252/180 |

FOREIGN PATENT DOCUMENTS

| 750509 | 5/1969 | Belgium | 252/180 |
|---|---|---|---|
| 904171 | 7/1972 | Canada | 252/180 |
| 1297515 | 11/1972 | United Kingdom | 210/700 |

OTHER PUBLICATIONS

Betz Handbook of Industrial Water Conditioning 1976, 7th Edition, Betz Laboratories, Inc., pp. 194-195.
Iler, The Chemistry of Silica, John Wiley & Sons, 1979, pp. 297, 327, 384-385, 388, 571-572, and 702-704.
Rothbaum et al., "Effect of Silica Polymerization and pH on Geothermal Scaling", Geothermics, vol. 8, pp. 1-20, 1979.
Harrar et al., "Final Report on Test of Proprietary Chemical Additives as Antiscalants for Hypersaline Geothermal Brine", UCID-18521, Lawrence Livermore National Laboratory, Jan. 1980.
The Nalco Water Hankbook, McGraw-Hill, pp. 8-6 to 8-8.
Principles of Industrial Water Treatment, Drew Chemical Corporation, pp. 79-80.

*Primary Examiner*—Ernest G. Therkorn
*Attorney, Agent, or Firm*—Harold M. Dixon; Roger S. Gaither; Richard G. Besha

[57] ABSTRACT

A method for inhibiting silica scaling and precipitation in geothermal flow systems by on-line injection of low concentrations of cationic nitrogen-containing compounds, particularly polymeric imines, polymeric amines, and quaternary ammonium compounds.

18 Claims, 1 Drawing Figure

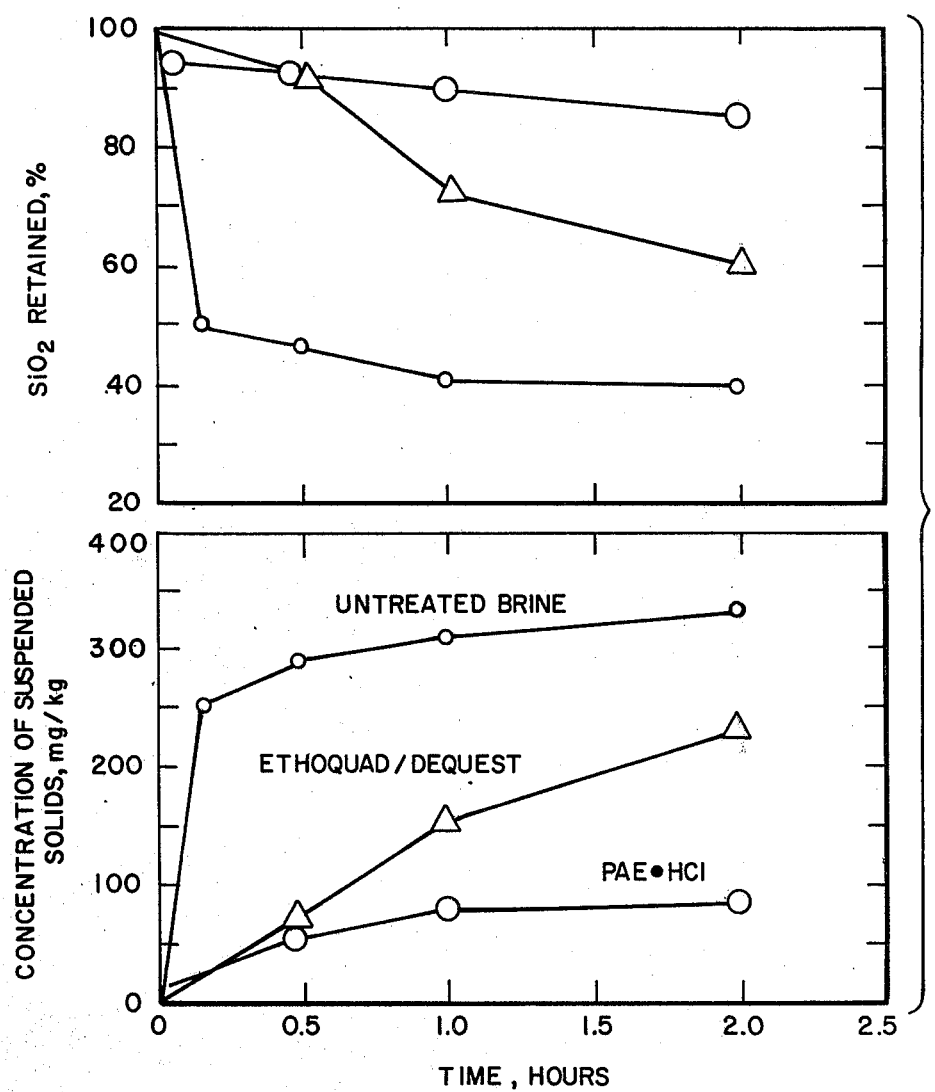

METHOD FOR INHIBITING SILICA PRECIPITATION AND SCALING IN GEOTHERMAL FLOW SYSTEMS

BACKGROUND OF THE INVENTION

The United States Government has rights in this invention pursuant to Contact W-7405-ENG-48 between the United States Department of Energy and the University of California (41 CFR 9-9.109-6(i)(5) (ii)(B)).

The invention relates to methods for inhibiting silica scaling by means of chemical additives, and more particularly methods for inhibiting silica scaling and precipitation in geothermal flow systems by on-line injection of low concentrations of active organic compounds.

The current energy crisis, caused mainly by the unavailability of oil, has led to increasing interest in other energy resources. The geothermal resources of the Imperial Valley in California, particularly the large high temperature Salton Sea Geothermal Field, is a potential source for the generation of electricity. However the geothermal fluid is a highly corrosive, high salinity brine containing several constituents that form deposits of scale on plant structures as the brine is cooled during the operating cycle of a plant. The scale formed is primarily heavy metal sulfides at the higher temperatures, about 220° C., and amorphous silica at the lower temperatures, less than 150° C. Because the low temperature silica-containing scale forms at the greatest rate and is limiting in terms of plant availability, it is a major problem in developing geothermal resources. The silica scale forms in large part because the cooling of the brine results in a condition of supersaturation with respect to the solubility of silica.

The rapid clogging of pipes, valves and other equipment by silica-rich scale is a major impediment to efficient operation of geothermal power plants. Severe scaling problems arise when the geothermal liquid is saturated with silica ($SiO_2$ and related compounds) at a temperature of utilization. An economical solution to the silica scaling problem is a prerequisite to the commercial development of geothermal resources.

Various methods of treating geothermal and non-geothermal fluids to control scaling and corrosion have been attempted or proposed by the geothermal, oil and gas, waste disposal, boiler water treatment and desalination industries. These methods include mechanical and chemical methods to remove scale, methods to control scale formation, and methods of corrosion control. Methods of removing scale include acidizing, reaming, cavitation descaling, thermal shock, and oil washing and injection. Methods for controlling silica scale in brine from producing wells include pH adjustment by addition of either acid or base, water dilution, magnesium addition, and the application of electrical potential. Available methods for dealing with silica scaling in geothermal systems are described in "A Study of Brine Treatment", S. L. Phillips et al, Energy and Environment Division, Lawrence Berkeley National Laboratory, Draft Report (Research Project RP-791-1) January 1977. Approaches for silica scale control are also described in report UCRL-83493, "Studies of Scale Formation and Scale Inhibitors at the Salton Sea Geothermal Field", Harrar et al, Lawrence Livermore Laboratory, October 1979.

Acidification of the brine is an effective method for decreasing the rate of scale formation. At a pH below 5, scale abatement begins and at a pH of about 3 scale deposition stops. However the method has a high cost in terms of the chemical requirements. The acidification method also worsens a competing problem, the problem of corrosion, and necessitates the use of more corrosion resistant materials of construction, thereby increasing the cost. Also, pH alteration of the brine complicates the operation of clarification equipment for processing spent brine for reinjection into the wells.

Inhibitors are known for calcite scale, $Mg(OH)_2$ scale, and other crystalline scales. For example, phosphonate additives are useful to control calcium carbonate scale. However, silica scale is amorphous and inhibitors for crystalline scales are inoperative on the silica scale.

U.S. Pat. Nos. 3,251,778 and 3,258,428 to Dickson and Jenkins, issued May 17, 1966, and June 28, 1966, respectively, describe classes of organic compounds useful as agents for scale prevention. The compounds include polyimines and polyamines. Both patents are directed at the prevention and removal of hard water scale.

U.S. Pat. No. 3,262,791 to Dickson and Jenkins, issued July 26, 1966, describes organic compounds including polyimines which are useful for preventing corrosion. Japanese Patent 74,106,440, issued Oct. 9, 1974, also describes the use of polyethylene imine as a corrosion inhibitor for mild steel in a chloride media.

To commercialize geothermal power, geothermal brine must be effectively treated to reduce scaling to prevent clogging of the equipment such as transport lines and pipes and to prevent a decrease in the efficiency of heat exchangers and loss in pressure head. The brine treatment problem is severe because of the large volume of fluid required for geothermal power production. The methods presently available are to remove scale by acidizing or mechanical reaming or to completely replace pipes and other components when they are no longer useable. These methods are totally inadequate for a geothermal power plant. A treatment technique for inhibiting silica scaling in geothermal brine must be low cost in order to be economically viable in a power plant.

Accordingly, it is an object of the invention to provide a method for inhibiting silica scaling and precipitation in geothermal flow systems.

It is another object of the invention to provide organic compounds useful at low concentrations to inhibit silica scaling and precipitation in geothermal flow systems.

It is a further object of the invention to provide organic compounds that interact with silica under the conditions of high temperature, high ionic strength, and high fluid shear rates in a geothermal flow system.

It is also an object of the invention to provide organic compounds that can be injected into a geothermal flow system near the well head to prevent silica precipitation and scaling in the downstream pipes, valves, and other components of the flow system as the brine is cooled during the operating cycle of the system.

SUMMARY OF THE INVENTION

The invention is a method of inhibiting silica scaling in geothermal flow systems by on-line injection of low concentrations of organic compounds which exhibit anti-scaling activity. According to the invention cationic nitrogen-containing compounds are active in silica scale suppression in hypersaline geothermal flow systems. In particular, polymeric imines, polymeric amines, and quaternary ammonium compounds are active in silica scale suppression. The invention includes a ternary mixture of active silica scale inhibitor, acid, and crystalline scale inhibitor.

BRIEF DESCRIPTION OF THE DRAWING

The FIGURE shows the results of precipitation tests of two silica scale inhibitors compared to untreated brine.

DETAILED DESCRIPTION OF THE PREFERRED EMBODIMENT

The invention is a method of inhibiting silica scaling in geothermal flow systems by on-line injection of cationic nitrogen-containing compounds at low concentrations. Cationic nitrogen-containing compounds are useful because they are ionic in character and therefore more easily soluble. Further, applicants have recognized the basis for silica scale suppression by organic additives is through the mechanism of colloid stabilization in which organic molecules dissolved in the brine are adsorbed on the surface of small suspended silica particles to hinder their aggregation and prevent scale formation. The mechanism involves either the formation of a hydrogen bond between oxygens or nitrogens of the organic molecule and the silanol groups of the silica, and/or an electrostatic attraction between a positively charged (cationic) organic molecule and a negatively charged silica.

The test apparatus utilized for studying the activity of various compounds in silica scale inhibition is described in report UCID-18091, Harrar et al, "On-Line Tests of Organic Additives for the Inhibition of the Precipitation of Silica from Hypersaline Geothermal Brine", Lawrence Livermore Laboratory, Apr. 3, 1979, and pages 3 to 6 in particular, which is herein incorporated by reference. Two-phase fluid from the geothermal well is first passed through a well head centrifugal separator. The brine typically has a pH in the range 5–6. The steam is discarded and single-phase brine is obtained at nearly well head temperature and pressure. The brine is then divided into two parallel channels so that two additives can be tested simultaneously or one additive vs. untreated brine as a control. The brine in each channel is flashed from about 200° C. to 125° C. in flash vessels and then passed to an atmospheric receiver. A third delay stage provides brine at atmospheric pressure at 90°–100° C. and aged about 10 minutes with respect to its input. Additive solution is introduced into the brine approximately eight feet upstream of the first test specimen using high pressure pumps equipped with pulsation dampers. The scaling tendency of the brine is measured at various points in the system by the use of various specimens including steel pipe sections or spools, flat coupons of mild steel, Teflon and Hastelloy, small diameter tubing and perforated disks. Generally, measurements are made at three points, at 220° C., 125° C. and in brine from the delay stage at about 90° C. The use of Teflon and Hastelloy eliminates the corrosion effects that affect the steel samples.

Precipitation tests are done first to select candidates for further scaling tests. To measure the effect of the additives on the rate of precipitation of silica, brine samples are collected from 125° C. sampling ports. As collected the brine flashes to 105° C. The brine is placed in air-tight glass bottles and incubated at 90° C.; at intervals of 30 minutes, 1 hour, etc., after sampling, the bottles are opened and the contents filtered. The collected solids are dried and weighed to measure the suspended solid concentration of the brine. The brine filtrate is analyzed for silica by atomic absorption spectrophotometry to determine the concentration of remaining (i.e., "dissolved", or unprecipitated) silica in the brine.

Initial tests evaluated proprietary chemical additives and cellulose compounds which were found to have minimal activity to suppress silica scaling. Tests of ethoxylated or ethylene oxide compounds showed that polymers of the oxyethylene moiety ($-CH_2CH_2O-$) strongly interacted with coloidal silica in hypersaline brine at temperatures below 100° C. In particular, polyoxyethylene with a molecular weight of about 14,000 showed the most activity. However at intermediate temperatures of about 125° C. scale reduction was minimal and perhaps even increased as a result of the inverse solubility-temperature characterics of these compounds.

The group of compounds according to the invention which show activity in reducing silica scaling and precipitation in geothermal brine over low and intermediate temperature ranges is cationic nitrogen-containing compounds, particularly polymeric imines, polymeric amines and quaternary ammonium compounds.

One preferred class of compounds which are active silica scale inhibitors according to the invention is polymeric imines. The most preferred compound is a polyethylene imine with a molecular weight of about 1,800, available under the trade name Corcat P-18 manufactured by Cordova Chemical. Polyethylene imines are composed of polymeric chains of the unit $-CH_2CH_2NH-$ and contain considerable branching. Polyethylene imines have the following structure:

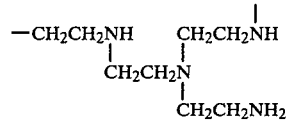

These compounds have a normal solubility-temperature characteristic and thus are effective at intermediate to high temperatures. Polyethylene imines have a further advantage of being corrosion inhibitors for iron as well as suppressing silica scaling. Corcat P-18 reduced the rates of scaling at 90° C. and 125° C. by factors of 18 and 4, respectively. In addition to the preferred polyethylene imine with MW=1,800 (Corcat P-18), compounds with higher molecular weights of 10,000; 20,000; and 40,000 were tested. Derivatized versions of the MW=10,000 compound were also tested, one quaternized with methyl chloride, one derived by reacting with chloroacetic acid, and a glycidol derivative.

A second class of compounds which exhibit silica scale reduction activity according to the invention is polymeric amines. In particular the hydrochloric acid salt of polyaminoethylene (or polyvinylamine), available under the trade name PAE.HCl manufactured by Dynapol, has been found to be an effective inhibitor. The compound PAE.HCl which is most effective has a molecular weight of approximately 120,000 and is an essentially linear polymer. The polyaminoethylene hydrochloric acid salt has the following structure:

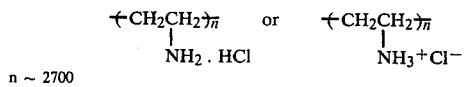

n ~ 2700

The compound PAE.HCl is not quite as good an antiscalant as Corcat P-18 at the lower and intermediate temperature but shows some effect of reducing scale formed at 220° C. In addition to the optimum MW=120,000, the lower MW=25,000 PAE HCl prepared by two different methods was also tested. Two polymeric tertiary amines RC-412 and RC-413 from American Cyanamid Company, with MW=10,000 and 30,000, respectively, were also tested.

A third class of active silica scale inhibitors according to the invention is quaternary ammonium compounds. In particular ethoxylated quaternary ammonium compounds which combine the properties of being both cationic nitrogen-containing compounds and polyoxyethylene compounds are advantageous. A methyl polyoxyethylene (15) octadecylammonium chloride compound, available under the trade name Ethoquad 18/25 manufactured by Armak Chemical, exhibits anti-scalant properties. The structure of the compound is:

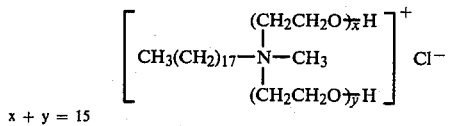

x + y = 15

The mixture of Ethoquad 18/25 and a phosphonate Dequest 2060, diethylenetriamine pentamethylene phosphonic acid manufactured by Monsanto, has shown even better properties. The phosphonate has no direct effect on the silica but is a powerful calcium carbonate scale inhibitor and enhances the silica anti-scaling properties of the mixture. Polydiquaternary ammonium chloride, available under the trade name Mirapol A-15 manufactured by Miranol Chemicals, also exhibits anti-scalant properties. The structure of the compound is:

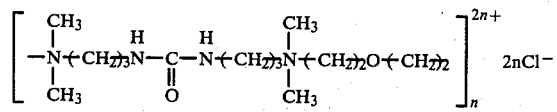

Ethoquad 18/25 was tested alone and with Dequest 2060. In addition Ethoquad HT-6OMS which has 50 molecules of oxyethylene substitution instead of 15 and Arquad 18/50 (Armak) in which methyl groups replace the oxyethylene were tested. The dipositive cationic compound, or diquat, Duoquad T-50 (Armak) and Duomac T (Armak), the acetic acid salt of N-tallow-1,3-diaminopropane were also tested.

The tests of various compounds are described in reports UCRL-84227, "Field Tests of Organic Additives for the Control of Scale at the Salton Sea Geothermal Field", Harrar et al., Lawrence Livermore National Laboratory, April 1980, pages 12–27 in particular, and UCID-18536, "On Line Tests of Organic Additives for the Inhibition of the Precipitation of Silica from Hypersaline Geothermal Brine-IV. Final Tests of Candidate Additives", Harrar et al., Lawrence Livermore Laboratory, February 1980, pages 5–10, 12–25, 29–38 in particular, which are herein incorporated by reference.

TABLE I

| | Scaling Rate, mm/day | | | | |
|---|---|---|---|---|---|
| | 200–210° C. | | 125° C. | | 90° C. |
| Additive | Steel | Teflon | Steel | Teflon | Steel |
| | Brine Chloride = 4.1 Mol/l, 40 hour tests | | | | |
| Control; no additive | 0.02 | 0.02 | 0.12 | 0.12 | 3.9 |
| Corcat P-18 (35 ppm) | 0.02 | 0.02 | 0.03 | 0.035 | 0.22 |
| PAE . HCl (35 ppm) | 0.006 | <0.005 | 0.05 | 0.055 | 0.5 |
| Ethoquad 18/25(35 ppm) | 0.006 | 0.01 | 0.18 | 0.36 | 0.9 |
| Ethoquad 18/25(27 ppm) + HCl (100 ppm) | <0 | 0.005 | 0.05 | 0.012 | 1.0 |
| | Brine Chloride = 4.5 Mol/l, 66–69 hour tests | | | | |
| Control; no additive | 0.06 | 0.04 | 0.48 | 0.41 | 3.0 |
| Ethoquad 18/25(25 ppm) | — | 0.08 | 0.41 | 0.31 | 1.7 |
| Ethoquad 18/25(20 ppm) + Dequest 2060 (5 ppm) | 0.09 | 0.06 | 0.27 | 0.32 | 0.55 |

The results of tests of the effect of these additives on silica scaling rates in hypersaline geothermal brine for steel and Teflon specimens at low, intermediate and high temperature ranges for several different brine conditions are shown in Table I. The best results are for Corcat P-18, PAE.HCl, and the Ethoquad 18/25-Dequest 2060 mixture. The combination of Ethoquad 18/25 with hydrochloric acid also showed good results. The results of precipitation tests with PAE.HCl and with Ethoquad/Dequest at 20 ppm in 90° C. brine compared to untreated brine as shown in the FIGURE. The results of precipitation tests from effluent brine at 90° C., 4.0–4.1 mol/l chloride brine, with 20 ppm active compound are shown in Table II. The results show that the low molecular weight polyethylene imine and the high molecular weight polyaminoethylene compounds are most effective. The polydiquaternary ammonium chloride was also a good inhibitor because of its very strong cationic character and its medium molecular weight polymeric structure.

The above-described classes of compounds, according to the invention, have been found to inhibit silica scaling in geothermal flow systems. According to the invention these compounds will inhibit the downstream deposition of silica scale when injected into the geothermal fluid at a point near the well head. The compounds have been found to be effective as scale inhibitors at the low and intermediate temperature ranges which will be encountered in a geothermal plant; the effectiveness at the high temperature is more limited. To be cost effective, the compounds must be injected at relatively low concentrations, in the range 20–40 ppm, preferably at 20 ppm or less. Such small amounts have, however, been found to be quite effective. Tests have been performed at both 20 ppm and 35 ppm. At higher concentrations improvement is marginal.

TABLE II

| | 1-h incubation | | 2-h incubation | | Brine |
|---|---|---|---|---|---|
| | Suspended Solids, mg/kg | $SiO_2$ in filtrate mg/kg | Suspended Solids, mg/kg | $SiO_2$ in filtrate mg/kg | Initial $SiO_2$, mg/kg |
| Additive | | | | | |

TABLE II-continued

|  | 1-h incubation | | 2-h incubation | | Brine |
| --- | --- | --- | --- | --- | --- |
|  | Suspended Solids, mg/kg | $SiO_2$ in filtrate mg/kg | Suspended Solids, mg/kg | $SiO_2$ in filtrate mg/kg | Initial $SiO_2$, mg/kg |
| None, Control | 305 | 240 | 326 | 196 | 493 |
| Armak: Quaternary Ammonium Compounds | | | | | |
| Arquad 18/50 | 112 | 424 | 257 | 280 | 474 |
| Ethoquad 18/25 | 126 | 406 | 200 | 303 | 493 |
| Duoquad T-50 | 145 | 378 | 222 | 304 | 474 |
| Ethoquad HT-60MS | 176 | 348 | 275 | 288 | 495 |
| Duomac T | 266 | 270 | 311 | 251 | 505 |
| Cordova: Polyethylene Imine Compounds | | | | | |
| Corcat P-18 | 130 | 423 | 250 | 325 | 502 |
| Corcat P-100 | 106 | 405 | 285 | 267 | 502 |
| Corcat P-200 | 228 | 355 | 286 | 276 | 502 |
| P-100, Quaternized | 199 | 340 | 250 | 285 | 502 |
| P-100, chloroacetic acid derivative | 237 | 318 | 286 | 270 | 509 |
| P-100, glycidol deriv. | 294 | 270 | 303 | 252 | 509 |
| Dynapol: Polyaminoethylene Compounds | | | | | |
| PAE . HCl MW = 120,000 | 135 | 400 | 304 | 251 | 505 |
| PAE . HCl MW = 25,000 | 207 | 344 | 258 | 294 | 524 |
| PAE . HCl MW = 25,000 Hofmann route | 355 | 202 | 393 | — | 524 |
| Miscellaneous: | | | | | |
| Mirapol A-15 | 151 | 395 | 234 | 312 | 500 |
| RC-413 MW = 30,000 | 166 | 364 | 246 | 307 | 500 |
| RC-412 MW = 10,000 | 254 | 312 | 307 | 252 | 501 |

The ideal anti-scalant for a geothermal flow system will combine the silica scale inhibiting effects of the cationic nitrogen-containing compounds at low concentration with other advantageous additives. A quantity of the silica inhibitor can be traded off for small amounts of much less expensive hydrochloric acid, which is an effective silica scale inhibitor. The acid provides anti-scalant activity at the high temperature ranges. At low concentration, the acid will not seriously increase corrosion problems, particularly where the silica inhibitor is also a corrosion inhibitor. In addition a phosphonate crystalline scale inhibitor such as Dequest 2060 can be added to form a ternary mixture of silica scale inhibitor, acid, and crystalline scale inhibitor to maximize overall performance.

Changes and modifications in the specifically described embodiments can be carried out without departing from the scope of the invention which is intended to be limited only by the scope of the appended claims.

We claim:

1. A method for inhibiting silica scaling and precipitation from silica-rich geothermal brine in geothermal flow systems comprising injecting a small but effective amount of a mixture of cationic nitrogen-containing compound, acid, and crystalline scale inhibitor into geothermal brine containing small suspended silica particles to cause the nitrogen-containing compound to adhere to the surface of colloidal silica particles and stabilize the colloidal silica to prevent aggregation of the particles, thereby preventing subsequent scale formation.

2. The method of claim 1 wherein the nitrogen-containing compound is a polyalkylene imine.

3. The method of claim 2 wherein the polyalkylene imine is a polyethylene imine.

4. The method of claim 3 wherein the polyethylene imine has a molecular weight of approximately 1800.

5. The method of claim 1 wherein the nitrogen-containing compound is a polyalkylene amine.

6. The method of claim 5 wherein the nitrogen-containing compound is a polyaminoethylene.

7. The method of claim 6 wherein the nitrogen-containing compound is a hydrochloric acid salt of polyaminoethylene.

8. The method of claim 7 wherein the nitrogen-containing compound has a molecular weight of approximately 120,000.

9. The method of claim 1 wherein the nitrogen-containing compound is a quaternary ammonium compound.

10. The method of claim 9 wherein the nitrogen-containing compound is methyl polyoxyethylene (15) octadecylammonium chloride.

11. The method of claim 9 wherein the nitrogen-containing compound is a polydiquaternary ammonium chloride.

12. The method of claim 1 wherein the concentration of the nitrogen-containing compound is approximately 40 ppm or less.

13. The method of claims 1, 4, 8, 10, or 11 wherein the concentration of the nitrogen-containing compound is approximately 20 ppm or less.

14. The method of claim 1 wherein the geothermal brine is at a temperature of about 50° C. or above.

15. The method of claims 1, 4, 8, 10 or 11 wherein the geothermal brine is at a temperature in the range of about 50° C. to about 220° C.

16. The method of claims 1, 4, 8, 10 or 11 wherein the acid is hydrochloric acid and the crystalline scale inhibitor is a phosphonate.

17. The method of claim 16 wherein the phosphonate is a diethylenetriamine pentamethylene phosphonic acid.

18. A ternary mixture for inhibiting silica scaling and precipitation from silica-rich geothermal brine containing small suspended silica particles in geothermal flow systems comprising (1) a cationic nitrogen-containing compound which adheres to the surface of colloidal silica particles in brine and stabilizes the silica to prevent aggregation of the particles, (2) hydrochloric acid, and (3) a phosphonate crystalline scale inhibitor.

* * * * *